United States Patent
Dulmage et al.

(10) Patent No.: US 10,338,604 B2
(45) Date of Patent: Jul. 2, 2019

(54) VEHICLE CONTROL SYSTEM

(71) Applicant: General Electric Company, Schenectady, NY (US)

(72) Inventors: Scott William Dulmage, Rockledge, FL (US); Robert Thomas Oliveira, Melbourne, FL (US); Jared Klineman Cooper, Palm Bay, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 395 days.

(21) Appl. No.: 15/236,789

(22) Filed: Aug. 15, 2016

(65) Prior Publication Data

US 2018/0043912 A1 Feb. 15, 2018

(51) Int. Cl.
| | |
|---|---|
| B61L 3/08 | (2006.01) |
| G05D 1/02 | (2006.01) |
| B61L 3/00 | (2006.01) |
| B61L 15/00 | (2006.01) |
| B61L 27/00 | (2006.01) |
| B60T 17/22 | (2006.01) |

(52) U.S. Cl.
CPC ............ *G05D 1/0295* (2013.01); *B61L 3/006* (2013.01); *B61L 3/008* (2013.01); *B61L 15/0027* (2013.01); *B61L 15/0081* (2013.01); *B61L 27/0022* (2013.01)

(58) Field of Classification Search
CPC .... B61L 3/08; B61L 27/0027; B61L 27/0077; B60T 17/228

USPC .......................................................... 701/19
See application file for complete search history.

(56) References Cited

U.S. PATENT DOCUMENTS

| | | | | |
|---|---|---|---|---|
| 2012/0290157 | A1* | 11/2012 | Siddappa | B61C 17/12 701/20 |
| 2013/0018531 | A1* | 1/2013 | Kumar | B61L 3/006 701/2 |
| 2013/0035811 | A1* | 2/2013 | Schroeck | B61C 15/14 701/19 |
| 2016/0009304 | A1 | 1/2016 | Kumar et al. | |
| 2018/0290672 | A1* | 10/2018 | Wright | B61L 15/0072 |

* cited by examiner

*Primary Examiner* — Tan Q Nguyen
(74) *Attorney, Agent, or Firm* — Christopher R. Carroll; The Small Patent Law Group LLC

(57) ABSTRACT

A vehicle control system includes a controller that determines a communication loss between a first vehicle and a second vehicle and/or a monitoring device in a vehicle system. The controller determines an operational restriction on movement of the vehicle system based on the communication loss that is determined, and obtains a transitional plan that designates operational settings of the vehicle system at different locations along a route being traveled by the vehicle system, different distances along the route, and/or different times. The controller also automatically changes the movement of the vehicle system according to the operational settings designated by the transitional plan to reduce the movement of the vehicle system to or below the operational restriction determined by the controller responsive to the communication loss being detected.

20 Claims, 3 Drawing Sheets

VEHICLE CONTROL SYSTEM

FIELD

Embodiments of the subject matter disclosed herein relate to systems that control movements of vehicles.

BACKGROUND

Some vehicle systems include multiple vehicles traveling together along a route. The vehicles can communicate with each other to coordinate the individual movements of the vehicles with each other. One non-limiting example of such a vehicle system is a rail vehicle system having multiple locomotives communicating with each other and/or with other vehicles (e.g., rail cars) during movement along the route. One or more of the locomotives may periodically communicate with an end-of-train (EOT) device that monitors one or more characteristics of the vehicle system, such as air brake pressure.

Responsive to a communication loss with the EOT device, the vehicle system may inform an onboard operator of the vehicle system. This operator may then be required to initiate a check on the communication with the EOT device and may be instructed to terminate any automatic control of the movement of the vehicle system. The operator may then reduce the moving speed of the vehicle system to or below a reduced speed limit (e.g., relative to a speed limit of the route that was applicable prior to the communication loss).

These operations by the operator require the operator to take his or her attention away from the other operations of the vehicle system. This can result in an unsafe situation, as the vehicle system may initially be traveling at a fast speed.

BRIEF DESCRIPTION

In one embodiment, a vehicle control system includes a controller configured to determine a communication loss between a first vehicle and one or more of a second vehicle or a monitoring device in a vehicle system that also includes the first vehicle. The controller also is configured to determine an operational restriction on movement of the vehicle system based on the communication loss that is determined. The controller also is configured to obtain a transitional plan that designates operational settings of the vehicle system at one or more different locations along a route being traveled by the vehicle system, different distances along the route being traveled by the vehicle system, or different times. The controller also is configured to automatically change the movement of the vehicle system according to the operational settings designated by the transitional plan to reduce the movement of the vehicle system to or below the operational restriction determined by the controller responsive to the communication loss being detected.

In one embodiment, a vehicle control system includes a controller configured to determine a communication loss between a first vehicle and one or more of a second vehicle or a monitoring device in a vehicle system that also includes the first vehicle. The controller is configured to determine an operational restriction on movement of the vehicle system based on the communication loss that is determined. The controller also is configured to change the movement of the vehicle system according to operational settings designated by a transitional plan to reduce the movement of the vehicle system to or below the operational restriction determined by the controller responsive to the communication loss being detected. The controller a;sp os configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

In one embodiment, a vehicle control system includes a controller configured to determine a communication loss between a first vehicle and one or more of a second vehicle or a monitoring device in a vehicle system that also includes the first vehicle. The controller is configured to determine an operational restriction on movement of the vehicle system based on the communication loss that is determined. The controller also is configured to obtain a transitional plan that designates operational settings of the vehicle system and to automatically change the movement of the vehicle system according to the operational settings designated by the transitional plan to reduce the movement of the vehicle system to or below the operational restriction determined by the controller responsive to the communication loss being detected. The controller also is configured to determine re-establishment of communication between the first vehicle and the one or more of the second vehicle or the monitoring device, and is configured to obtain a return plan that designates different operational settings of the vehicle system to increase the movement of the vehicle system above the operational restriction.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide vehicle control systems that detect losses in communication between two or more vehicles in the same vehicle system and automatically determine a transitional plan to shift operation (e.g., movement) of the vehicle system from a current state (e.g., traveling at a speed limit of a route) to a reduced state (e.g., traveling at a reduced speed limit). The transitional plan may be generated and/or implemented automatically to change throttle settings, brake settings, or the like, of the vehicle system without requiring operator intervention or action. This can reduce distractions to the operator and allow the operator to continue monitoring other operations of the vehicle system during transition from the current state to the reduced state. The control systems may detect when the communication loss is terminated (e.g., when communication between the vehicles is re-established) and, responsive to regaining communication, the control systems may automatically determine a return plan to shift operation of the vehicle system from the reduced state back to a normal or fully operational state (e.g., traveling at the speed limit of the route). The return plan may be generated and/or implemented automatically to change throttle settings, brake settings, or the like, of the vehicle system without requiring operator intervention or action.

Figure 1:
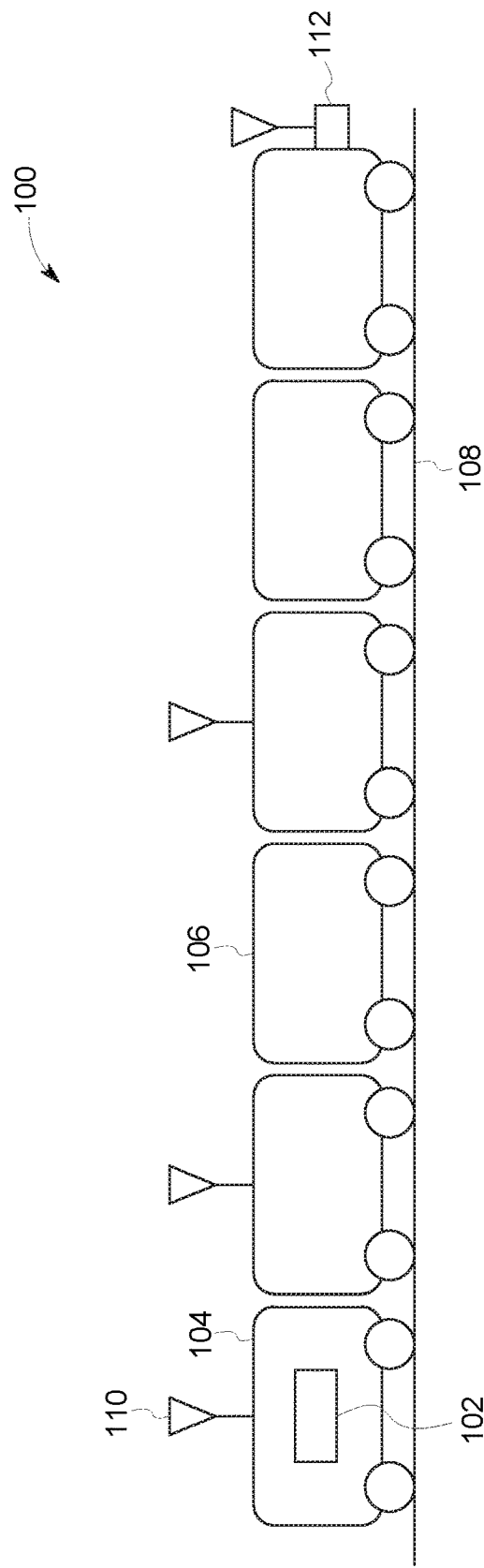
FIG. 1 illustrates one embodiment of a vehicle system having a control system disposed thereon.

FIG. 1 illustrates one embodiment of a vehicle system 100 having a control system 102 disposed thereon. The vehicle system 100 includes two or more vehicles 104, 106 traveling together along a route 108. The vehicles 104 can include one or more propulsion-generating vehicles, such as automobiles, locomotives, marine vessels, mining vehicles, or other off-highway vehicles (e.g., vehicles that are not legally permitted or not designed for travel on public roadways) that generate propulsive force to move the vehicles and the vehicle system along the route. The vehicles 106 optionally can include one or more non-propulsion-generating vehicles, such as trailers, rail cars, barges, or the like, that do not generate propulsive force. The number and arrangement of the vehicles are provided merely as one example and are not limiting on all embodiments of the inventive subject matter described herein. The vehicles may be mechanically coupled with each other (e.g., by couplers) or may not be mechanically coupled, but may be logically coupled. For example, the vehicles may not be connected with each other, but may communicate with each other via onboard communication devices 110 to allow the vehicles and/or other devices described herein to communicate with each other. In one embodiment, the vehicles may communicate with each other to coordinate the propulsive and braking forces generated by the vehicles so that the vehicles travel together along the route as the vehicle system.

At least one of the vehicles includes the control system that determines and optionally automatically implements operational settings of one or more of the vehicles. As described below, the control system may obtain an operational plan that dictates or designates different operational settings of the vehicle system and/or vehicles for different locations along the route, different times during a trip of the vehicle system, and/or different distances along the route. For example, the operational plan may designate different speeds, throttle settings, brake settings, etc., that the vehicle system and/or vehicles are to travel according to at different locations along the route. This plan may be generated to reduce fuel consumption and/or emission generation by the vehicle system (while still traveling on schedule) relative to the vehicle system traveling according to other settings (e.g., traveling at the speed limit of the route the entire time).

The control system may communicate with devices off-board the vehicle on which the control system is disposed. For example, the control system may communicate with a monitoring device 112 that is disposed onboard another vehicle of the same vehicle system. The monitoring device 112 can measure or sense characteristics of the vehicle system and report the characteristics to the control system. In one embodiment, the monitoring device 112 is an end-of-train (EOT) or end-of-vehicle (EOV) device that is disposed at a trailing end of the vehicle system (e.g., along a direction of travel of the vehicle system). The monitoring device 112 may measure characteristics such as a status of a braking system of the vehicle system (e.g., air pressure in an air brake system) and communicate this information to the control system via the communication devices of the monitoring device and the control system.

The control system may use the information provided by the monitoring device to determine whether and how to change operations of the vehicle system. For example, responsive to determining that there is insufficient air pressure in the braking system of the vehicle system to safely stop movement of the vehicle system in the event of an emergency, the control system may reduce speed of the vehicle system.

As another example, the control system may communicate with control systems disposed onboard other vehicles in the same vehicle system. For example, the control system onboard one of the vehicles may communicate with control systems onboard other vehicles (e.g., propulsion-generating vehicles) to direct the operational settings of the other vehicles. This type of arrangement can be referred to as a distributed power (DP) arrangement. The control system onboard the vehicle that is directing the operational settings of other vehicles may be referred to as a lead control system onboard a lead vehicle, although the lead control system may not be disposed onboard the vehicle at the front end of the vehicle system (e.g., along the direction of travel of the vehicle system).

Because of the importance of the information communicated between the control system and one or more other components disposed on other vehicles, a loss in communication between the control system and one or more of these components can present a significant safety risk. The control system may be designed (e.g., programmed or otherwise configured) to determine an operational restriction on movement of the vehicle system responsive to such a communication loss occurring. This operational restriction can include a reduced speed limit (e.g., a speed limit that is slower than the speed limit of the route that is in place without the communication loss), a limitation on changes in the throttle settings of the vehicle system (e.g., a prohibition on increasing the throttle setting), or the like. The control system may determine a transitional plan for changing movement of the vehicle system from a current state to a reduced state that complies with the operational restriction and may then automatically implement this transitional plan.

For example, the control system may generate a plan or communicate with an energy management system (described below) to obtain a plan that dictates or designates different operational settings of the vehicle system at different locations, different times, and/or different distances along the route. Implementation of this plan can transition operation of the vehicle system from a current state (e.g., the speed at which the vehicle system was traveling prior to or at the time when the communication loss occurred) to a reduced state (e.g., the reduced speed limit). Responsive to communication being re-established, the control system may determine or obtain a return plan that dictates or designates different operational settings of the vehicle system at different locations, times, and/or distances along the route. Implementation of this return plan can transition operation of the vehicle system from the reduced state to another state, such as the state of the vehicle system prior to or at the time of the communication loss, travel at the speed limit of the route (e.g., and not the reduced limit), or another state. These plans may be determined and/or implemented automatically (e.g., without operator intervention) to eliminate or reduce distraction to an operator of the vehicle system (relative to the operator manually determining or implementing the plans).

Figure 2:
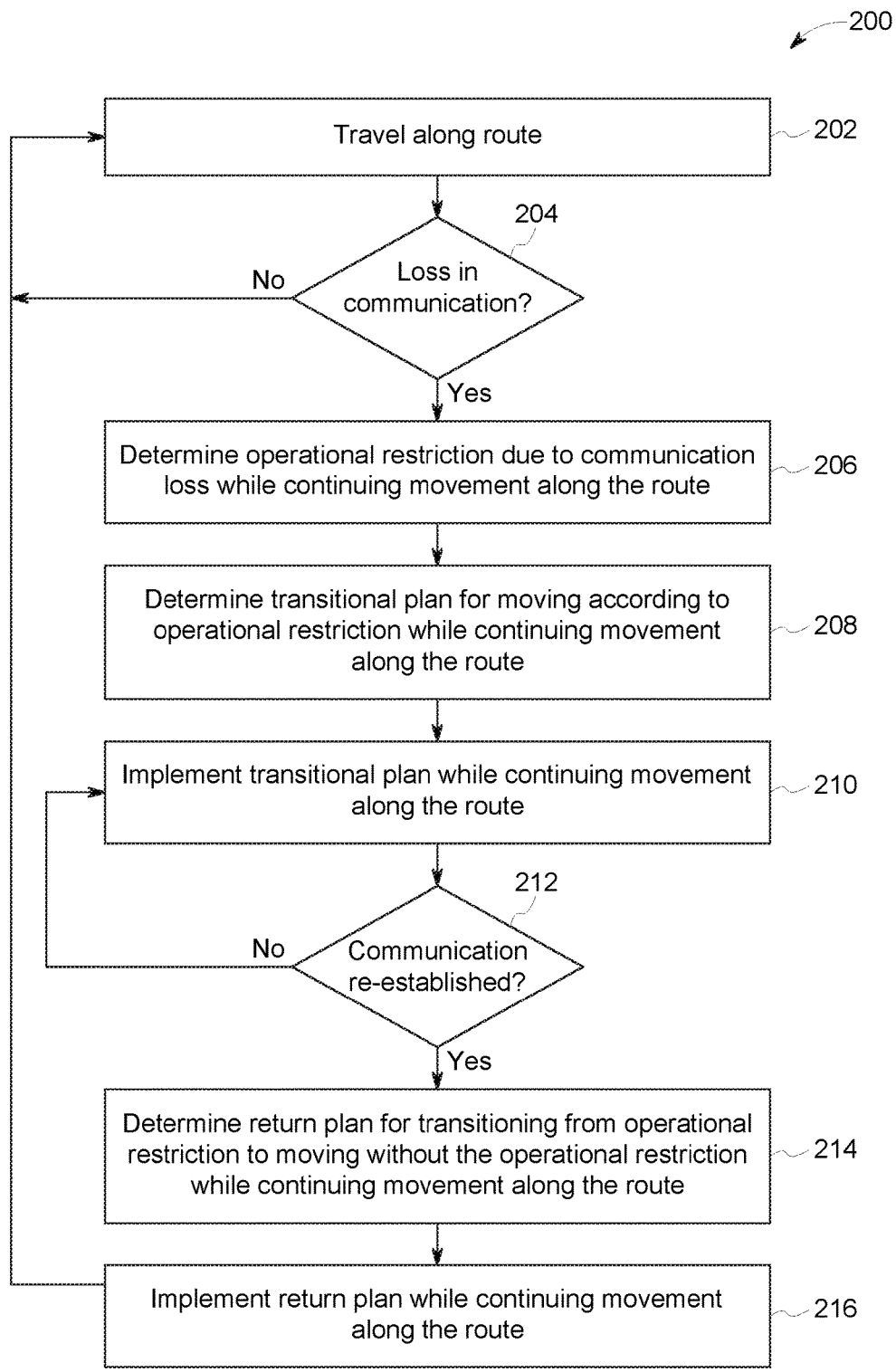
FIG. 2 illustrates a flowchart of one embodiment of a method for controlling operation of the vehicle system shown in FIG. 1.

FIG. 2 illustrates a flowchart of one embodiment of a method 200 for controlling operation of the vehicle system 100 (shown in FIG. 1). The method 200 represents operations that may be performed by the control system shown in FIG. 1, the software application operating on or with the control system 102 (shown in FIG. 1), and/or an algorithm that may be used to control operation of the control system.

At 202, the vehicle system travels (e.g., moves) along the route 108 (shown in FIG. 1). The vehicle system may move automatically according to an operational plan. The operational plan directs the control system 102 (shown in FIG. 1) to control the vehicle system to travel at different speeds, use different throttle settings, or the like, during movement along the route. The operational plan may dictate or designate different operational settings at different times, locations along the route, and/or distances along the route. The operational plan may be generated to reduce fuel consumption and/or emission generation of the vehicle system relative to the vehicle system traveling using other settings, such as by traveling at the speed limit of the route during the entire trip. In one embodiment, the operational plan may be a trip plan as described in U.S. patent application Ser. No. 14/863,998, the entire disclosure of which is incorporated herein by reference.

Figure 3:
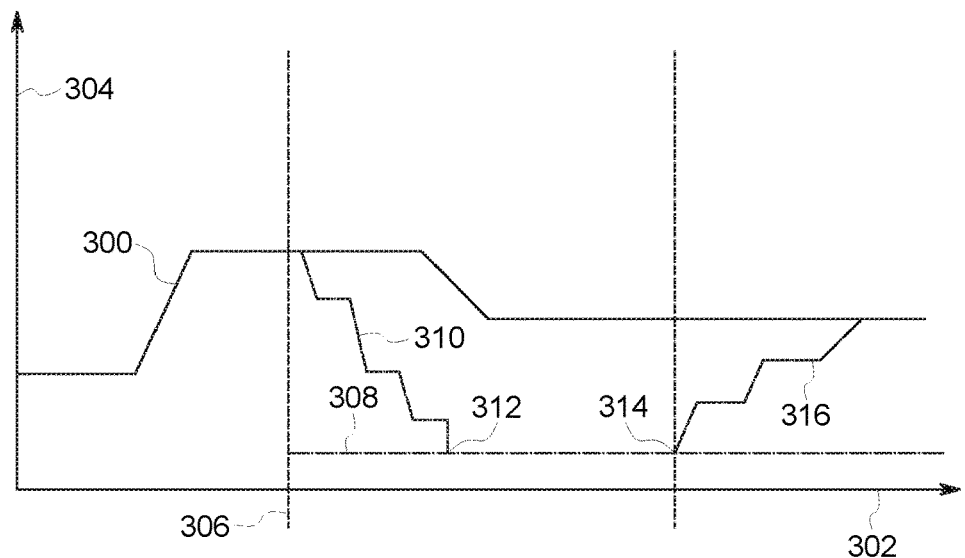
FIG. 3 illustrates one example of movement of the vehicle system along a route 108 shown in FIG. 1.

With continued reference to the flowchart of the method 200 shown in FIG. 2, FIG. 3 illustrates one example of movement of the vehicle system 100 along the route 108 shown in FIG. 1. The movement of the vehicle system is represented by an operational plan 200 shown alongside a horizontal axis 202 and a vertical axis 204. The horizontal axis is representative of different locations along the route, time, and/or different distances along the route. The vertical axis is representative of different operational settings of the vehicle system, such as speeds, throttle settings, or the like. As described above, the operational plan may dictate or designate different operational settings of the vehicle system at different locations along the route, times, and/or distances along the route.

At 204 in the flowchart of the method 200, a determination is made as to whether the control system has experienced or detected a communication loss. The control system may lose the ability to communicate with another vehicle and/or the monitoring device 112 (shown in FIG. 1). The control system may use the information provided by the monitoring device to determine whether and how to change operations of the vehicle system. For example, responsive to determining that there is insufficient air pressure in the braking system of the vehicle system to safely stop movement of the vehicle system in the event of an emergency, the control system may reduce speed of the vehicle system.

The communication loss may occur due to interference, a fault in one or more communication devices, or the like. A communication loss may be identified responsive to the control system being unable to communicate (e.g., receive and/or send one or more signals) with another vehicle or the monitoring device for at least a designated period of time, such as at least ten seconds, at least fifteen seconds, or at least twenty seconds. If a communication loss occurs, then flow of the method 200 can proceed toward 206. Otherwise, flow of the method 200 can return toward 202. In FIG. 3, a communication loss 306 occurs at a time, location on the route, and/or distance along the route shown along the horizontal axis 302.

At 206 in the flowchart of the method 200, an operational restriction 308 (shown in FIG. 3) on movement of the vehicle system is determined responsive to the communication loss occurring. The control system may determine the operational restriction while the vehicle system continues to move along the route. The operational restriction may be a reduced speed limit (e.g., slower than the speed limit of the route), reduced upper limit on throttle settings, or the like. The operational restriction may be based on the route and/or a current operational setting of the vehicle system. For example, different routes may be associated with different reduced speed limits that are to be used in response to a communication loss. As another example, the operational restriction may be a fraction of a current moving speed of the vehicle system, such as half of the current speed.

In one embodiment, the operational restriction may be based on or obtained from a wayside device. For example, positive train control (PTC) systems have wayside devices disposed alongside a route. These devices can communicate with nearby vehicles via wired connections (e.g., through conductive rails of a route) and/or wireless connections in order to inform the vehicles of speed restrictions. The wayside devices can communicate the operational restriction that is determined at 206 to the control system. For example, if a PTC system would require vehicle systems to travel no faster than ten kilometers per hour (kph) if an upcoming segment of the route were occupied or damaged, then this speed restriction may be communicated to the control system as the operational restriction. The speed restriction can be communicated even if the cause for implementing the speed restriction (e.g., the route occupancy or damage) is not actually occurring.

At 208 in the flowchart of the method 200, a transitional plan 310 (shown in FIG. 3) for moving the vehicle system according to the operational restriction is determined. The control system may determine the transitional plan or may obtain the transitional plan from an energy management system. The control system may determine the transitional plan to cause the vehicle system to change from moving according to a current state of the vehicle system (e.g., moving according to the operational plan or manual control of the vehicle system) to the operational restriction.

The transitional plan dictates operational settings of the vehicle system that change (with respect to time, locations along the route, and/or distance along the route) from the current operational setting of the vehicle system to the operational restriction associated with the communication loss. The current operational setting may be the operational setting of the vehicle system prior to, at, and/or subsequent to the communication loss, as shown in FIG. 3. The transitional plan differs from an immediate transition to the operational setting in that the transitional plan may not be the fastest change from the current operational setting to the operational restriction. The fastest transition may be a transition that is as quick as possible given mechanical and/or physical restrictions on the vehicle system. Optionally, the transitional plan may be determined so as to reduce the fuel consumed, emissions generated, and/or wear and tear on the vehicle system relative to a faster transition to the operational restriction.

In one embodiment, the transitional plan may be determined to reduce the operational setting (e.g., speed) of the vehicle system from the operational plan or current state to the operational restriction. The transitional plan may reduce the operational settings of the vehicle system to the operational restriction over a longer or different time period than abruptly changing the operational settings of the vehicle system to match the operational restriction. For example, instead of making a direct change from a current state to the state that complies with the operational restriction (e.g., changing from a state where the brakes are not engaged to a state where the brakes are fully engaged), the transitional plan may partially apply the braking system of the vehicle system, followed by reducing the throttle setting of the vehicle system or vehicles for a designated period of time, followed by partially apply the braking system of the vehicle system, followed by reducing the throttle setting of the vehicle system or vehicles for a designated period of time, and so on.

The transitional plan may be created to take advantage of grades and/or curvatures in the route, weather conditions, or other factors. For example, if the vehicle system is headed up an inclined segment of the route, on a curve of the route, and/or into a head wind, then the transitional plan may at least partially rely on gravitational forces pulling the vehicle system down the grade in the route, frictional forces slowing the vehicle system on the curve, and/or drag forces exerted on the vehicle system by the headwind to slow the vehicle system toward the operational restriction, instead of engaging the brake system and/or reducing the throttle settings of the vehicle system. Optionally, the transitional plan may dictate a smaller reduction in the application of the brake system and/or in the throttle setting compared to the vehicle system not traveling up the inclined grade, on the curve, and/or into the headwind. This can result in less fuel being consumed, fewer emissions being generated, less air loss in an air brake system, less wear and tear on the braking system and/or propulsion system, or the like, when compared to larger changes in the brake settings and/or throttle settings of the vehicle system.

At 210 in the flowchart of the method 200, the transitional plan may be implemented to move the vehicle system along the route. The control system may direct the propulsion system and/or brake system of the vehicle system to implement the operational settings of the transitional plan, such as by sending signals to the brake system and/or control system that indicate which brake settings and/or throttle settings are to be used by the brake system and/or control system.

The vehicle system may continue to move along the route according to the transitional plan. The transitional plan eventually causes the vehicle system to move using operational settings that are at or below the operational restriction. The operational settings of the vehicle system may eventually decrease until the settings are at or below the operational restriction at a confluence event 312, as shown in FIG. 3. For example, if the vehicle system is traveling along the route at a speed of forty kph when the communication loss is detected or identified and the operational restriction is travel at a speed no greater than twenty kph, the transitional plan may gradually direct and cause the vehicle system to slow down and move at speeds that do not exceed twenty kph.

At 212 in the flowchart of the method 200, a determination is made as to whether communication is re-established with the device associated with the communication loss. For example, the control system may attempt to communicate with the other vehicle and/or monitoring device with which communication was lost at the communication loss. The control system may attempt to re-establish communication with the vehicle and/or monitoring device one or more following the communication loss. If the control system is able to successfully communicate with the other vehicle and/or monitoring device, then communication with the other vehicle and/or monitoring device may be re-established and flow of the method 200 may proceed toward 214. Communication may be re-established by the control system receiving a signal sent from the other vehicle and/or monitoring device, and/or by the control system sending a signal to the other vehicle and/or monitoring device and receiving a response signal from the other vehicle and/or monitoring device. If the control system is not able to successfully communicate with the other vehicle and/or monitoring device, then communication with the vehicle and/or monitoring device may not be re-established. As a result, the method 200 may return toward 210 so that the vehicle system continues operating according to the transitional plan and/or at or below the operational restriction.

With respect to the example shown in FIG. 3, communication may be established at a re-established communication 314. The re-establishment of communication may occur after the vehicle system has begun moving at or below the operational restriction (as shown in FIG. 3) or before the vehicle system has begun moving at or below the operational restriction.

At 214, a return plan is determined for transitioning movement of the vehicle system back to moving without the operational restriction. In contradiction to the transitional plan, a return plan 316 (shown in FIG. 3) dictates or directs operational settings of the vehicle system that increase above the operational restriction (if the re-established communication occurs after the vehicle system is operating at or below the operational restriction) or that increase the operational settings of the vehicle system (if the re-established communication occurs before the vehicle system operates at or below the operational restriction).

In one embodiment, the return plan dictates operational settings of the vehicle system that change (with respect to time, locations along the route, and/or distance along the route) from a current operational setting of the vehicle system to the operational settings of the operational plan 300 shown in FIG. 3. The return plan differs from an immediate transition back to the operational plan in that the return plan may not be the fastest change from the current operational setting to the operational plan. The fastest transition may be a transition that is as quick as possible given mechanical and/or physical restrictions on the vehicle system. Optionally, the return plan may be determined so as to reduce the fuel consumed, emissions generated, and/or wear and tear on the vehicle system relative to a faster transition back to the operational plan.

In one embodiment, the return plan may be determined to increase the operational setting (e.g., speed) of the vehicle system to the operational plan by increasing the operational settings of the vehicle system over a longer or different time period than abruptly changing the operational settings of the vehicle system. For example, instead of fully disengaging the brake system and/or increasing the throttle setting to a maximum setting, the return plan may partially disengage the braking system of the vehicle system and/or gradually increase the throttle setting, as shown in FIG. 3.

The return plan may be created to take advantage of grades in the route and/or weather conditions. For example, if the vehicle system is headed down a declined segment of the route and/or with a tailwind, then the return plan may at least partially rely on gravitational forces pulling the vehicle system down the grade in the route and/or forces exerted on the vehicle system by the tailwind to increase the speed of the vehicle system back to the operational plan, instead of increasing the throttle settings of the vehicle system to a maximum setting. This can result in less fuel being consumed, fewer emissions being generated, less air loss in an air brake system, less wear and tear on the braking system and/or propulsion system, or the like, when compared to larger changes in the brake settings and/or throttle settings of the vehicle system.

At 216 in the flowchart of the method 200, the return plan is implemented to cause the vehicle system to return to traveling according to the operational plan or optionally to move according to other operational settings that exceed the operational restriction. As shown in FIG. 3, the operational settings of the vehicle system may gradually increase back to or toward the operational plan. Alternatively, the control system may obtain an updated or new operational plan having different operational settings than the previous operational plan (that also exceed the operational restriction), and the vehicle system may follow the return plan to reach the updated or new operational plan.

Flow of the method 200 may return back toward 202 so that the vehicle system can continue operating at operational settings that are not restricted by the operational restriction unless and until another communication loss occurs. The method may be implemented automatically and without operator intervention so that an operator is not distracted by examining the communication loss and/or manually reducing the operational settings of the vehicle system to or below the operational restriction. Instead, this occurs automatically so that the operator can direct his or her attention on other matters, such as looking out for obstructions on the route ahead of the vehicle system.

Figure 4:
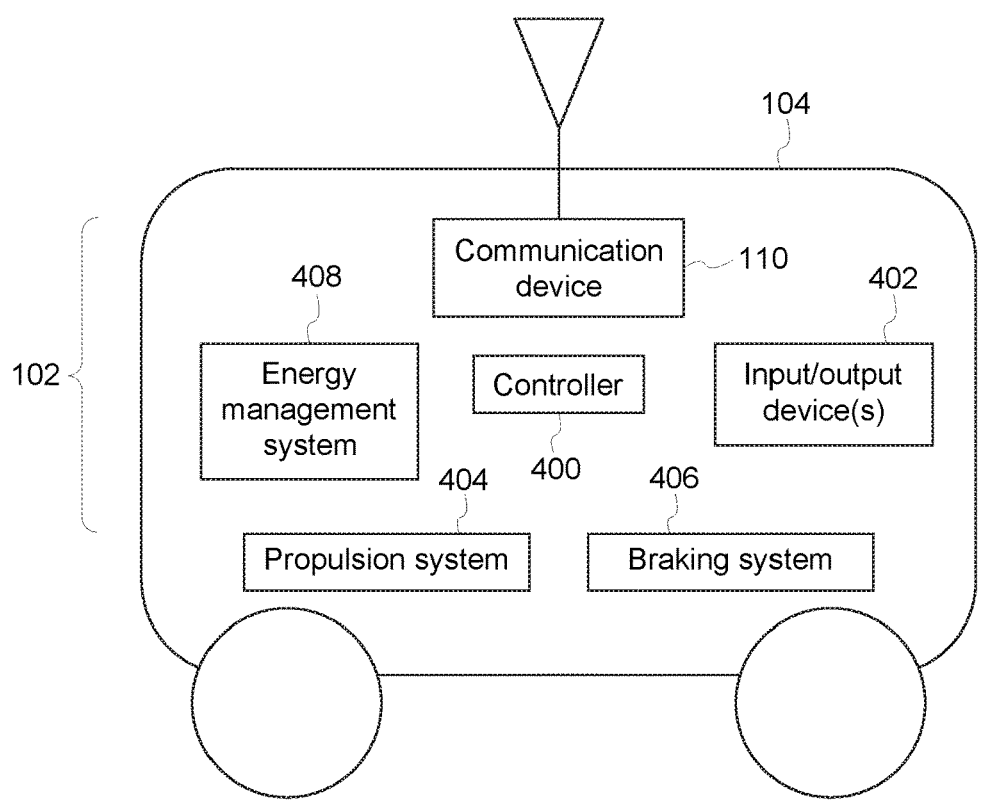
FIG. 4 illustrates one embodiment of the control system shown in FIG. 1.

FIG. 4 illustrates one embodiment of the control system 102 shown in FIG. 1. The control system is shown as being disposed onboard a single vehicle 104, but alternatively can include components disposed onboard multiple vehicles such that the control system is distributed among the vehicles. The other vehicles 104 of the vehicle system may include some or all of the same components as shown in FIG. 4. For example, one vehicle may include the control system that directs operations of other vehicles having the same or similar control systems and other components.

The control system 102 includes a controller 400 representative of hardware circuitry that includes and/or is connected with one or more processors (e.g., microprocessors, field programmable gate arrays, integrated circuits, or the like) that perform the operations described above in connection with the method 200 shown in FIG. 2. The controller 400 may include an internal memory in which information used to perform the method is stored (e.g., operational restrictions, operational plans, transitional plans, return plans, grades of routes, curvatures of routes, predicted weather conditions, etc.), and/or may access another memory (e.g., computer hard drive, computer disk, etc.) to obtain this information. Optionally, the controller 400 can receive this information via the communication device 110 and/or one or more input devices 402.

The communication device 110 represents hardware transceiving circuitry that can communicate signals with other communication devices and/or other components via wired and/or wireless connections. The communication device 110 may include transceivers, modems, antennas, or the like, for communicating the signals.

The input/output devices 402 represent one or more input devices and/or one or more output devices. The input devices of the devices 402 can include one or more keyboards, microphones, touchscreens, buttons, switches, levers, or the like. The output devices of the devices 402 can include one or more speakers, display devices, touchscreens, lights, etc.

As described above, the control system can communicate signals to a propulsion system 404 and/or braking system 406 of the vehicle to control operation of these systems. The propulsion system may include one or more engines, alternators, generators, batteries, motors, or the like, for generating propulsive force to move the vehicle. The braking system may include one or more friction brakes, air brakes, dynamic brakes, or the like, for slowing or stopping movement of the vehicle.

An energy management system 408 represents hardware circuitry that includes and/or is connected with one or more processors (e.g., microprocessors, field programmable gate arrays, integrated circuits, or the like) that generates or otherwise determines the plans described herein. The energy management system can create the operational plan, transitional plan, and/or return plan as described in connection with creating trip plans in U.S. patent application Ser. No. 14/863,998.

In one embodiment, a vehicle control system includes a controller configured to determine a communication loss between a first vehicle and one or more of a second vehicle or a monitoring device in a vehicle system that also includes the first vehicle. The controller also is configured to determine an operational restriction on movement of the vehicle system based on the communication loss that is determined. The controller also is configured to obtain a transitional plan that designates operational settings of the vehicle system at one or more different locations along a route being traveled by the vehicle system, different distances along the route being traveled by the vehicle system, or different times. The controller also is configured to automatically change the movement of the vehicle system according to the operational settings designated by the transitional plan to reduce the movement of the vehicle system to or below the operational restriction determined by the controller responsive to the communication loss being detected.

In one example, the operational restriction is a reduced speed limit that is slower than a previously designated speed limit of the route.

In one example, the transitional plan designates one or more of different throttle settings, different brake settings, or different speeds of the vehicle system at the one or more different locations along the route, different distances along the route, or different times.

In one example, the controller is configured to automatically change the movement of the vehicle system according to the transitional plan by automatically changing one or more of a throttle setting or a brake setting of the vehicle system to slow the movement of the vehicle system to below the operational restriction.

In one example, the controller is configured to receive the operational restriction from a wayside device disposed off board the vehicle system.

In one example, the controller is configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

In one example, the controller is configured to determine re-establishment of communication between the first vehicle and the one or more of the second vehicle or the monitoring device. The controller also can be configured to obtain a return plan that designates different operational settings of the vehicle system at the one or more different locations along the route, different distances along the route being traveled by the vehicle system, or different times to increase the movement of the vehicle system above the operational restriction.

In one example, the controller is configured to obtain the return plan responsive to the communication being re-established and to automatically change the movement of the vehicle system according to the different operational settings designated by the return plan.

In one embodiment, a vehicle control system includes a controller configured to determine a communication loss between a first vehicle and one or more of a second vehicle or a monitoring device in a vehicle system that also includes the first vehicle. The controller is configured to determine an operational restriction on movement of the vehicle system based on the communication loss that is determined. The controller also is configured to change the movement of the vehicle system according to operational settings designated by a transitional plan to reduce the movement of the vehicle system to or below the operational restriction determined by the controller responsive to the communication loss being detected. The controller a;sp os configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

In one example, the operational restriction is a reduced speed limit that is slower than a previously designated speed limit of a route.

In one example, the transitional plan designates one or more of different throttle settings, different brake settings, or different speeds of the vehicle system at one or more different locations along a route, different distances along the route, or different times.

In one example, the controller is configured to automatically change the movement of the vehicle system according to the transitional plan by automatically changing one or more of a throttle setting or a brake setting of the vehicle system to slow the movement of the vehicle system to below the operational restriction.

In one example, the controller is configured to receive the operational restriction from a wayside device disposed off board the vehicle system.

In one example, the controller is configured to obtain the transitional plan responsive to the communication loss being determined.

In one example, the controller is configured to determine re-establishment of communication between the first vehicle and the one or more of the second vehicle or the monitoring device. The controller also can be configured to obtain a return plan that designates different operational settings of the vehicle system at the one or more different locations along a route, different distances along the route being traveled by the vehicle system, or different times to increase the movement of the vehicle system above the operational restriction.

In one example, the controller is configured to obtain the return plan responsive to the communication being re-established and to automatically change the movement of the vehicle system according to the different operational settings designated by the return plan.

In one embodiment, a vehicle control system includes a controller configured to determine a communication loss between a first vehicle and one or more of a second vehicle or a monitoring device in a vehicle system that also includes the first vehicle. The controller is configured to determine an operational restriction on movement of the vehicle system based on the communication loss that is determined. The controller also is configured to obtain a transitional plan that designates operational settings of the vehicle system and to automatically change the movement of the vehicle system according to the operational settings designated by the transitional plan to reduce the movement of the vehicle system to or below the operational restriction determined by the controller responsive to the communication loss being detected. The controller also is configured to determine re-establishment of communication between the first vehicle and the one or more of the second vehicle or the monitoring device, and is configured to obtain a return plan that designates different operational settings of the vehicle system to increase the movement of the vehicle system above the operational restriction.

In one example, the operational restriction is a reduced speed limit that is slower than a previously designated speed limit of a route.

In one example, each of the transitional plan and the return plan designates one or more of different throttle settings, different brake settings, or different speeds of the vehicle system at one or more different locations along a route, different distances along the route, or different times.

In one example, the controller is configured to automatically change the movement of the vehicle system according to the operational settings designated by the transitional plan and according to the operational settings designated by the return plan.

The foregoing description of certain embodiments of the inventive subject matter will be better understood when read in conjunction with the appended drawings. The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system comprising:
a controller configured to determine a communication loss between a first vehicle and one or more of a second vehicle or a monitoring device in a vehicle system that also includes the first vehicle, the controller configured to determine an operational restriction on movement of the vehicle system based on the communication loss that is determined,
wherein the controller also is configured to obtain a transitional plan that designates operational settings of the vehicle system at one or more different locations along a route being traveled by the vehicle system, different distances along the route being traveled by the vehicle system, or different times, and
wherein the controller is configured to automatically change the movement of the vehicle system according to the operational settings designated by the transitional plan to reduce the movement of the vehicle system to or below the operational restriction determined by the controller responsive to the communication loss being detected.

2. The vehicle control system of claim 1, wherein the operational restriction is a reduced speed limit that is slower than a previously designated speed limit of the route.

3. The vehicle control system of claim 1, wherein the transitional plan designates one or more of different throttle settings, different brake settings, or different speeds of the vehicle system at the one or more different locations along the route, different distances along the route, or different times.

4. The vehicle control system of claim 1, wherein the controller is configured to automatically change the movement of the vehicle system according to the transitional plan by automatically changing one or more of a throttle setting or a brake setting of the vehicle system to slow the movement of the vehicle system to below the operational restriction.

5. The vehicle control system of claim 1, wherein the controller is configured to receive the operational restriction from a wayside device disposed off board the vehicle system.

6. The vehicle control system of claim 1, wherein the controller is configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

7. The vehicle control system of claim 1, wherein the controller is configured to determine re-establishment of communication between the first vehicle and the one or more of the second vehicle or the monitoring device, the controller also configured to obtain a return plan that designates different operational settings of the vehicle system at the one or more different locations along the route, different distances along the route being traveled by the vehicle system, or different times to increase the movement of the vehicle system above the operational restriction.

8. The vehicle control system of claim 7, wherein the controller is configured to obtain the return plan responsive to the communication being re-established and to automatically change the movement of the vehicle system according to the different operational settings designated by the return plan.

9. A vehicle control system comprising:
a controller configured to determine a communication loss between a first vehicle and one or more of a second vehicle or a monitoring device in a vehicle system that also includes the first vehicle, the controller configured to determine an operational restriction on movement of the vehicle system based on the communication loss that is determined,
wherein the controller is configured to change the movement of the vehicle system according to operational settings designated by a transitional plan to reduce the movement of the vehicle system to or below the operational restriction determined by the controller responsive to the communication loss being detected, and
wherein the controller is configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

10. The vehicle control system of claim 9, wherein the operational restriction is a reduced speed limit that is slower than a previously designated speed limit of a route.

11. The vehicle control system of claim 9, wherein the transitional plan designates one or more of different throttle settings, different brake settings, or different speeds of the vehicle system at one or more different locations along a route, different distances along the route, or different times.

12. The vehicle control system of claim 9, wherein the controller is configured to automatically change the movement of the vehicle system according to the transitional plan by automatically changing one or more of a throttle setting or a brake setting of the vehicle system to slow the movement of the vehicle system to below the operational restriction.

13. The vehicle control system of claim 9, wherein the controller is configured to receive the operational restriction from a wayside device disposed off board the vehicle system.

14. The vehicle control system of claim 9, wherein the controller is configured to obtain the transitional plan responsive to the communication loss being determined.

15. The vehicle control system of claim 9, wherein the controller is configured to determine re-establishment of communication between the first vehicle and the one or more of the second vehicle or the monitoring device, the controller also configured to obtain a return plan that designates different operational settings of the vehicle system at the one or more different locations along a route, different distances along the route being traveled by the vehicle system, or different times to increase the movement of the vehicle system above the operational restriction.

16. The vehicle control system of claim 15, wherein the controller is configured to obtain the return plan responsive to the communication being re-established and to automatically change the movement of the vehicle system according to the different operational settings designated by the return plan.

17. A vehicle control system comprising:
a controller configured to determine a communication loss between a first vehicle and one or more of a second vehicle or a monitoring device in a vehicle system that also includes the first vehicle, the controller configured to determine an operational restriction on movement of the vehicle system based on the communication loss that is determined,
wherein the controller also is configured to obtain a transitional plan that designates operational settings of the vehicle system and to automatically change the movement of the vehicle system according to the operational settings designated by the transitional plan to reduce the movement of the vehicle system to or below the operational restriction determined by the controller responsive to the communication loss being detected, and
wherein the controller is configured to determine re-establishment of communication between the first vehicle and the one or more of the second vehicle or the monitoring device, the controller also configured to obtain a return plan that designates different operational settings of the vehicle system to increase the movement of the vehicle system above the operational restriction.

18. The vehicle control system of claim 17, wherein the operational restriction is a reduced speed limit that is slower than a previously designated speed limit of a route.

19. The vehicle control system of claim 17, wherein each of the transitional plan and the return plan designates one or more of different throttle settings, different brake settings, or different speeds of the vehicle system at one or more different locations along a route, different distances along the route, or different times.

20. The vehicle control system of claim 17, wherein the controller is configured to automatically change the movement of the vehicle system according to the operational settings designated by the transitional plan and according to the operational settings designated by the return plan.

* * * * *